United States Patent [19]
Tai

[11] Patent Number: 6,012,077
[45] Date of Patent: Jan. 4, 2000

[54] METHOD AND APPARATUS FOR INDICATING OVERFLOW STATUS OF BIT-VARIABLE DATA EMPLOYING PIPELINING ADDER

[75] Inventor: Chiao-Yen Tai, Hsinchu, Taiwan

[73] Assignee: United Microelectronics Corporation, Hsinchu, Taiwan

[21] Appl. No.: 08/511,540

[22] Filed: Aug. 4, 1995

[51] Int. Cl.$^7$ .................................................. G06F 7/38
[52] U.S. Cl. .............................................................. 708/552
[58] Field of Search .................................. 708/498, 552, 708/490

[56] References Cited

U.S. PATENT DOCUMENTS

| | | | |
|---|---|---|---|
| 5,369,438 | 11/1994 | Kim | 708/552 |
| 5,745,397 | 4/1998 | Nadehara | 708/552 |

*Primary Examiner*—Tan V. Mai
*Attorney, Agent, or Firm*—Ladas & Parry

[57] ABSTRACT

An apparatus and a method for indicating the computational adder overflow status of bit-variable data employing a pipelining adder. An adder is provided with a first input port and a second input port, for adding a multiple-bit data input from the second input port. A plurality of shift registers receive and store in parallel a plurality of multiple-bit data output from the adder, and sequentially output the plurality of multiple-bit data to the second input port of the adder in response to a clock signal. A comparing circuit simultaneously receives and compares a multiple-bit data output from the adder and a multiple-bit data output from a plurality of shift registers. An overflow arbitrating unit arbitrates the overflow status of each multiple-bit data in accordance with a comparing result from the comparing circuit as well as a selective signal.

18 Claims, 5 Drawing Sheets

6,012,077

METHOD AND APPARATUS FOR INDICATING OVERFLOW STATUS OF BIT-VARIABLE DATA EMPLOYING PIPELINING ADDER

BACKGROUND OF THE INVENTION

1. Field of the Invention

This invention relates to a computational adder overflow indicating method and an apparatus of the same, and more particularly, to a method and an apparatus for indicating the computational adder overflow status of bit-variable data employing a pipelining adder.

2. Description of Pertinent Technology

To date, an adder in integrated form is a very basic and important element for arithmetic operation in electronic devices and computers. The overflow signal generated from the adder is also important as a reference signal for many control applications and for judging whether the adding result is correct or not. For example, for a 8-bit adder, if the adding result is 256, the data output by the adder would be 00000001. This result is apparently wrong because the adder is in overflow status. The overflow signal can be used to indicate the error or to correct the adding result. Usually, a register is used to store a carry bit which indicates the overflow status of the adder. Generally, if overflow signals of each multiple-bit data are to be output respectively, a plurality of adders must be used to respectively calculate the plurality of multiple-bit data in which the numbers and bit-lengths of the adders are predetermined corresponding to the numbers and bit-lengths of the multiple-bit data. As shown in FIG. 1, there are N multiple-bit data needed to be respectively calculated. Hence, the architecture has to comprise N adders 1a to 1d and N overflow indicating devices 2a to 2d. Each adder has a different bit-length corresponding to the data being calculated. For example, the adder 1a is a 3-bit adder, the adder 1b is a 6-bit adder, the adder 1c is a 8-bit adder and the adder 1d is a 12-bit adder. The adders 1a to 1d are respectively employed to process the four kind of data, i.e., 3-bit data DA1, 6-bit data DB1, 8-bit data DC1 and 12-bit data DD1. The input data DA1, DB1, DC1 and DD1 are correspondingly added with the output (i.e., DA2, DB2, DC2 and DD2, respectively) of the adders. And the overflow indicating devices 2a to 2d are respectively employed to indicate the overflow status of the adders 1a to 1d. However, these types of architectures are too complex and expensive because of the need for a large number of adders. Moreover, these types of structures appear wasteful when it is desired to merely output the overflow signal but not the adding result.

SUMMARY OF THE INVENTION

It is therefore an object of the present invention to provide a method and an apparatus for indicating the overflow status of bit-variable data employing a pipelining adder which has a simplified architecture.

In accordance with one aspect of this invention, the arithmetically operational architecture using the pipeline adding method is applied so that only one adder is needed to add a plurality of multiple-bit data, avoiding the necessity to use a large number of adders to indicate the overflow status of a plurality of multiple-bit data.

The present invention achieves the above indicated objects by providing an apparatus for indicating the overflow status of bit-variable data employing a pipelining adder. The overflow indicating apparatus includes an adder, a plurality of shift registers, a comparing circuit and an overflow arbiter. The adder has a first input port and a second input port for adding a multiple-bit data input from the first input port and a multiple-bit data input from the second input port. The plurality of shift registers receive and store in parallel a plurality of multiple-bit data output from the adder and sequentially output the plurality of multiple-bit data into the second input port of the adder in response to a clock signal. The comparing circuit simultaneously receives and compares a multiple-bit data output from the adder and a multiple-bit data output from the plurality of shift registers. The overflow arbiter arbitrates the overflow status of each multiple-bit data in accordance with the comparing result from the comparing circuit.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example and not intended to limit the invention solely to the embodiments described herein, will best be understood in conjunction with the accompanying drawings in which.

In all of the drawings, the identical reference numeral represents the same or similar components of the overflow indicating apparatus utilized for the description of the present invention.

Detailed Description of the Preferred Embodiment

Figure 1:
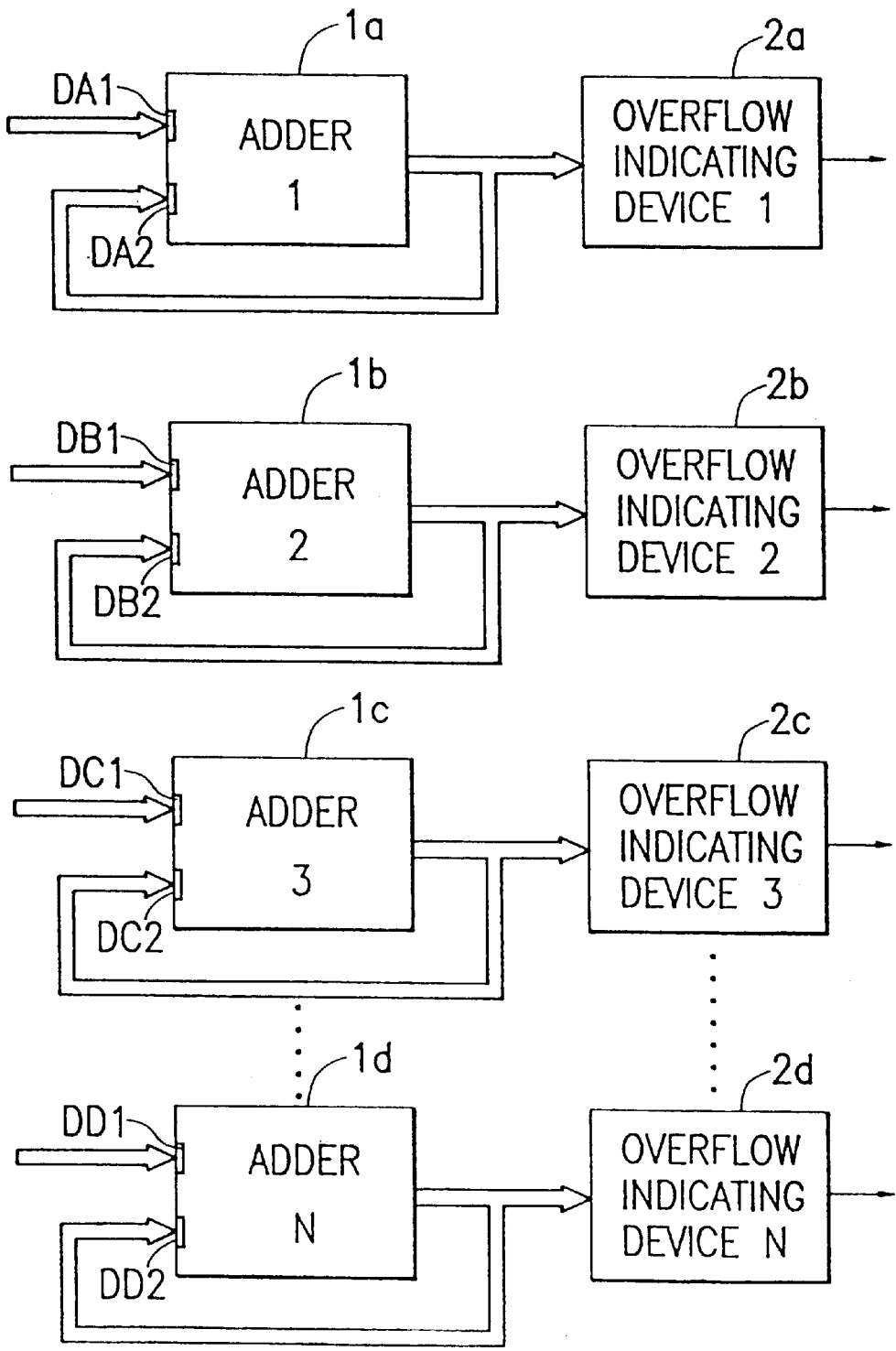
FIG. 1 is a block diagram illustrating a conventional architecture for indicating the overflow status of a plurality of multiple-bit data.
Figure 2:
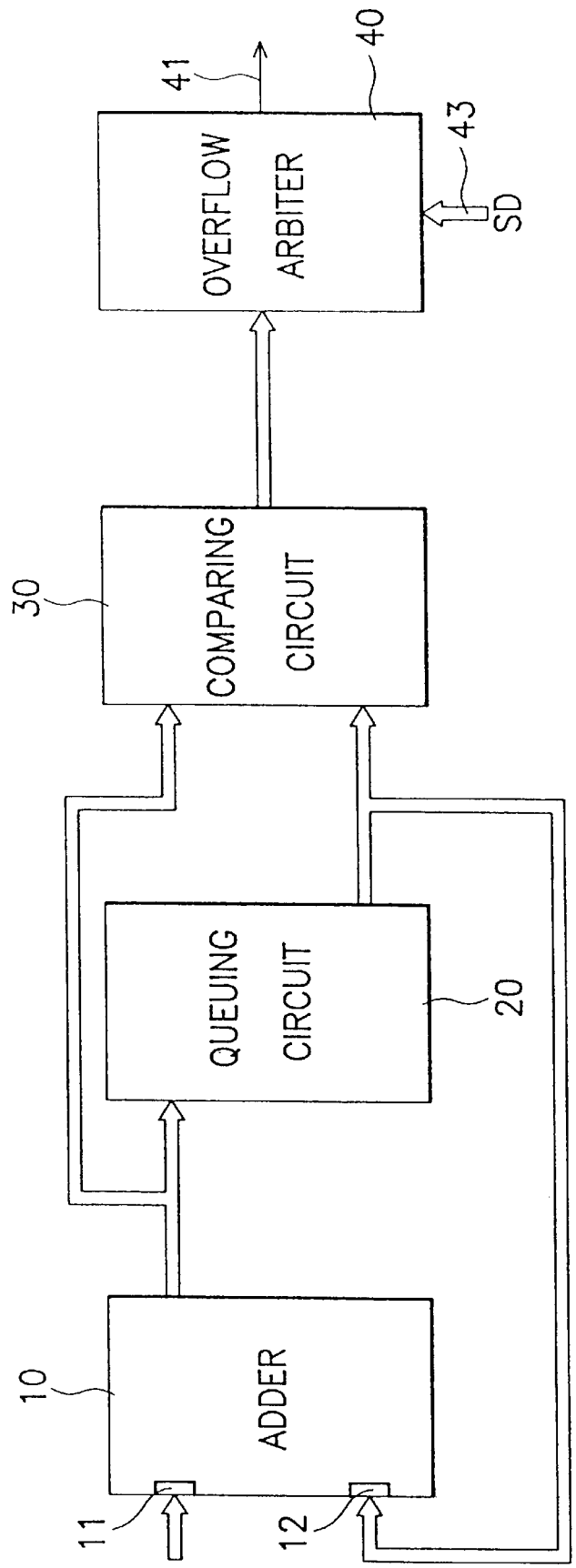
FIG. 2 is a block diagram of the apparatus for indicating the overflow of a bit-variable pipelining adder in accordance with this invention.

A description will be given of an embodiment of the present invention by first referring to FIGS. 2 and 3. As shown in FIG. 2, an overflow indicating apparatus of the present invention generally includes an adder 10, a queuing device 20, a comparing circuit 30, and an overflow arbitrating unit 40. The adder 10 has a data input port 11 which is provided to input a plurality of multiple-bit data sequentially by pipelining and an adding result input port 12 which is provided to input the feedback of the adding result (i.e., the output of the queuing device 20). Each output port of the adder 10 respectively outputs the adding results to the input ports of the queuing device 20 and a certain number of input ports of the comparing circuit 30 as illustrated in FIG. 2. The output ports of the queuing device 20 are connected to the other input ports of the comparing circuit 30, and also connected to the adding input port 12 of the adder 10 by a data bus. Each of the output ports of the comparing circuit 30 respectively output the comparing results into each input port of the overflow arbitrating unit 40. The overflow arbitrating unit 40, which includes a multiplexer, can selectively output a bit representing the overflow status of a multiple-bit data in response to a selecting signal SD 43 generated by a central processing unit (not shown). That is, the overflow status can be decided in accordance with the level of the bit output from the output port 41 of the overflow arbitrating unit 40.

Figure 3:
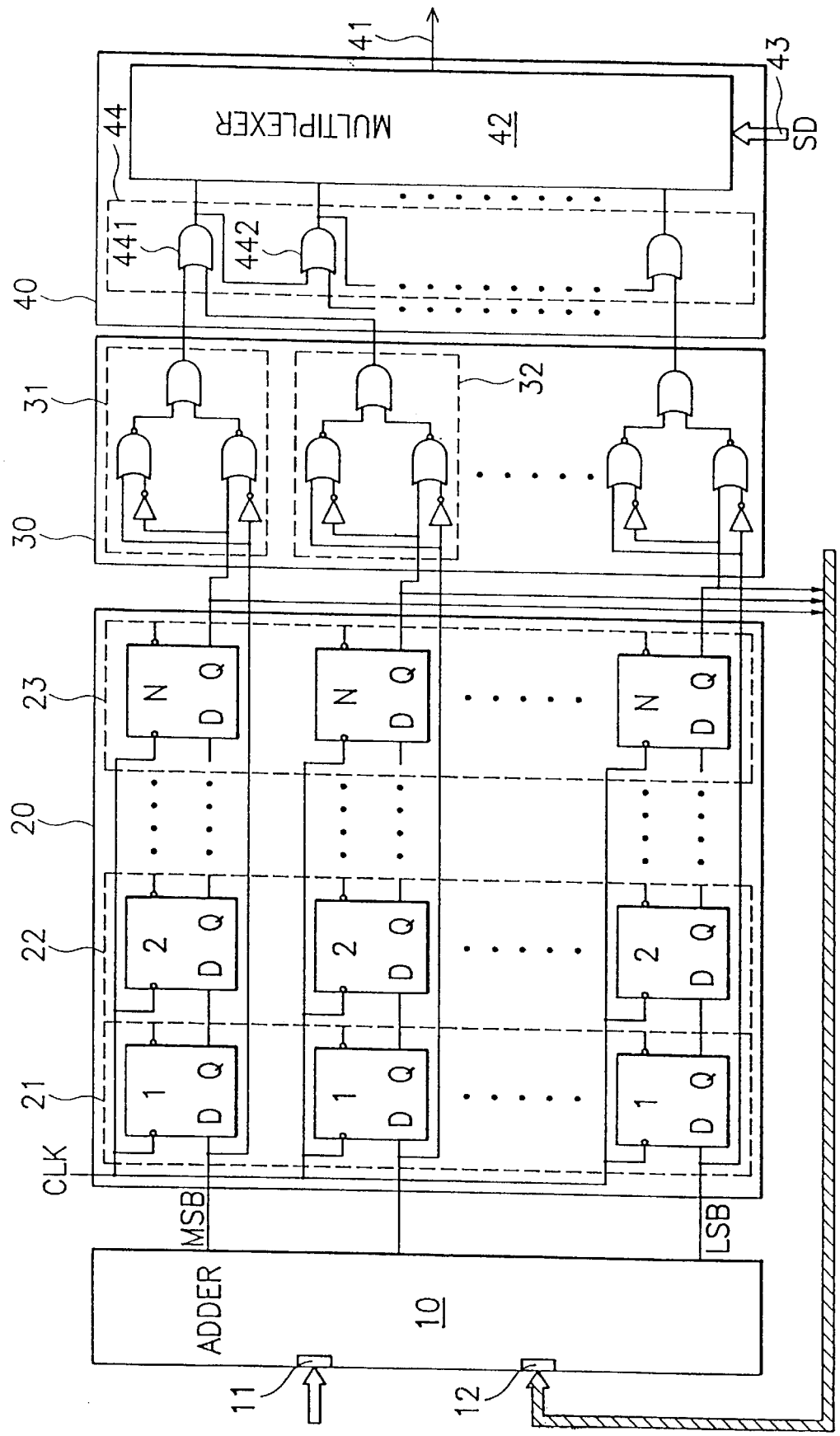
FIG. 3 schematically illustrates a circuit diagram according to a preferred embodiment of this invention.

FIG. 3 depicts the circuit diagram of a preferred embodiment according to the present invention in which the queuing device 20 includes a plurality of shift registers, e.g. M shift register, where M is the maximum bit-length of the multiple-bit data, and each of the plurality of shift registers includes N flip-flops corresponding to the number of the multiple-bit data. As shown in FIG. 3, the uppermost shift register is used to store the most significant bit (MSB) of a multiple-bit data with a maximum bit-length and the lowermost shift register is used to store the least significant bit (LSB) of each multiple-bit data. However, in the drawings, the MSB being schematically located on the top line of shift registers is only for M-bit data. If the data has a lesser amount of bits, then the MSB of the data would be located at a middle shift register not the top. The location of the MSB depends on the bit-length of the data.

A multiple-bit data is input in the adder 10 through the data input port 11, and then the multiple-bit data is output in parallel into the first column 21 of flip-flops. Thereafter the multiple-bit data is transferred in parallel from the first column 21 of flip-flops into the second column 22 of flip-flops at a clock pulse of a clock signal CLK, meanwhile another multiple-bit data is input in parallel into the first column 21 of flip-flops. After N clock pulses, the queuing device 20 will be fully stored with the plurality of multiple-bit data. At this time, the multiple-bit data being first input is stored in the last column 23 of flip-flops, and will be output in parallel into the comparing circuit 30 and into the adding input port 12 of the adder 10 simultaneously at the next clock pulse. Therefore the multiple-bit data is input into the first column 21 of flip-flops and into the comparing circuit 30 after adding. However, the comparing circuit 30 simultaneously receives the multiple-bit data and one data representing the adding result of the multiple-bit data and another input data. The another input data must have a same bit-length as the multiple-bit data. Thereby the comparing circuit 30 compares the two multiple-bit data (i.e., the data before adding and the data after adding) to output data indicating whether the multiple-bit data is overflow or not. In other words, as soon as the previous data bit of MSB of the output data (e.g., the fourth bit for a 3-bit data) is converted from 0 to 1, it means that the state of the overflow signal of the multiple-bit data is changed. That is, the multiple-bit data is overflow. As shown in FIG. 3, the comparing circuit 30 includes a plurality of comparators, e.g., M comparators, each of the comparators is provided with two input ports and one output port. The comparator will output logical "1" (i.e., high level) when the two input ports are simultaneously input with two different binaries (i.e., 1 for one input port and 0 for another input port). Namely, the comparator outputs logical "1" merely when the status of the data bit inputting the comparator is changed after adding, otherwise the comparator outputs logical "0" (i.e., low level).

Figure 4:
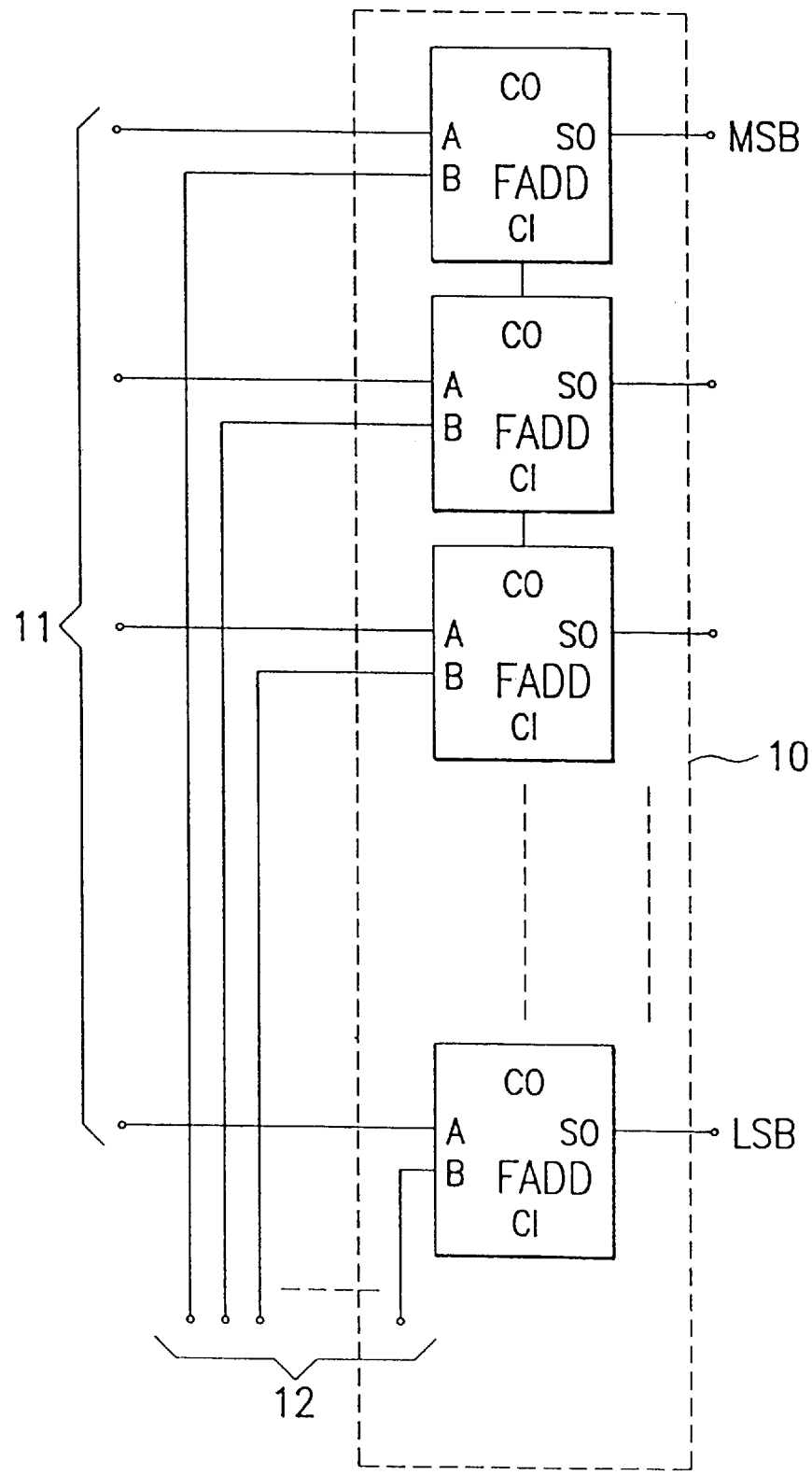
FIG. 4 schematically illustrates a circuit diagram of the adder according to a preferred embodiment of this invention.

Referring to FIG. 4, the adder 10 includes a plurality of full adders FADD. Moreover, all of the input terminals A of the full adders constitute the data input port 11. And all of the input terminals B of the full adders constitute the adding input port 12.

Referring again to FIG. 3, the overflow arbitrating unit 40 includes a plurality of logical gates 44, e.g. OR gate, and a multiplexer 42. When an upper logical gate corresponding to the MSB of a multiple-bit data outputs logical "1", it causes all of the other logical gates below the upper logical gate to output logical "1". For example, if the output level of the OR gate 441 is logical "1", the OR gate 442 will output logical "1" since the output port of the OR gate 441 is connected to the input port of the OR gate 442. Therefore the multiplexer 42 will output a signal to represent the overflow status of the multiple-bit data in accordance with a selecting signal SD 43. The selecting signal SD is used to control the multiplexer 42 to output the overflow binary for different multiple-bit data since the bit-lengths of the plurality of multiple-bit data are not completely the same. The bit positions of overflow binaries are different for multiple-bit data with different bit-lengths. For example, the selecting signal SD controls the multiplexer 42 to output the fourth bit of the multiplexer 42 as an overflow binary for a 3-bit data.

Figure 5A:
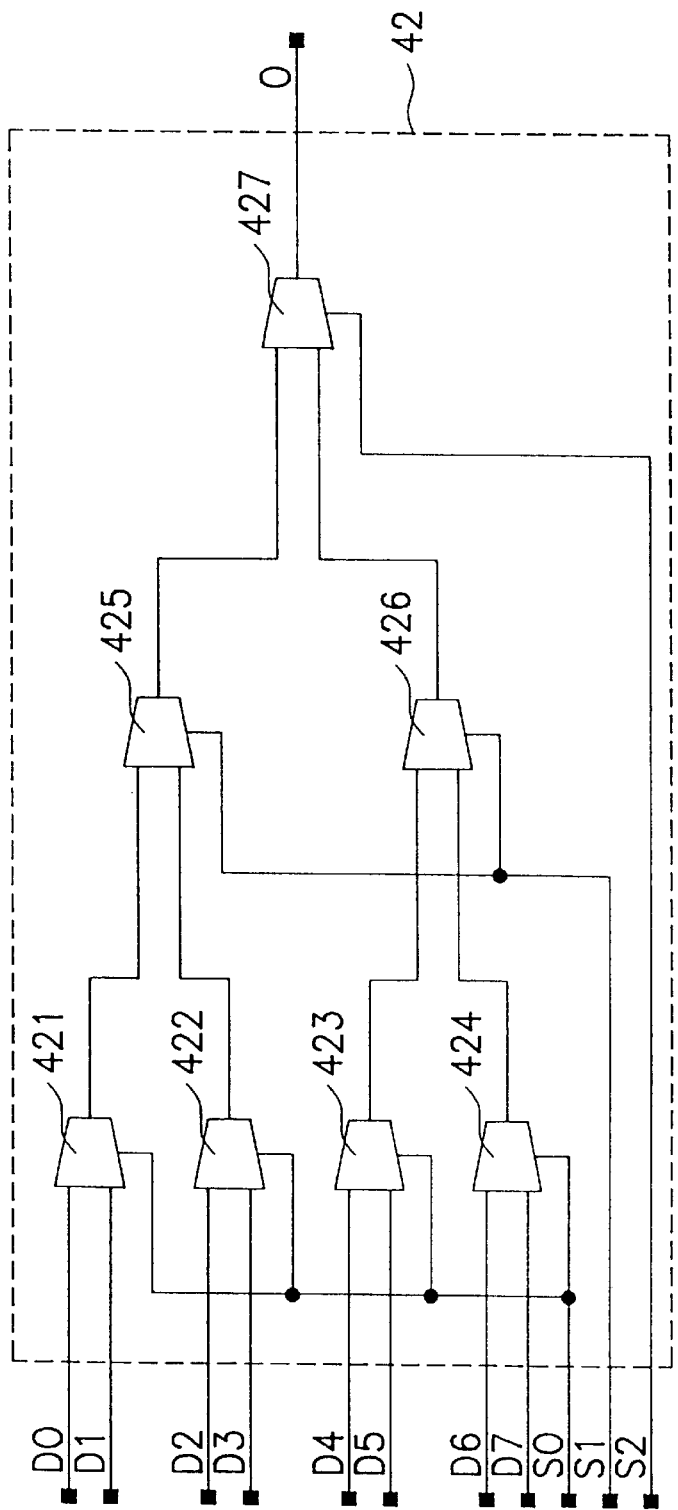
FIG. 5a and FIG. 5b schematically illustrate a circuit diagram of the multiplexer according to a preferred embodiment of this invention.
Figure 5B:
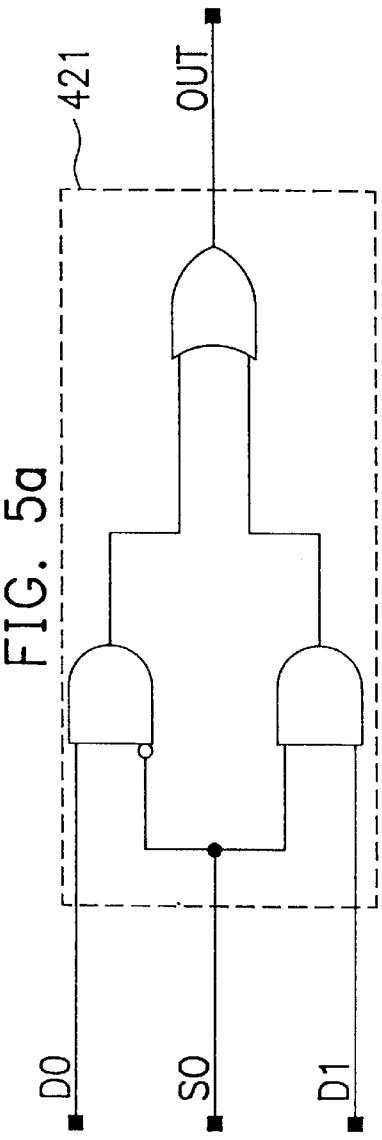

Reference is now made to FIG. 5a, wherein the multiplexer 42 of the overflow arbitrating unit 40 is, for example, an 8-to-1 multiplexer which includes a plurality of 2-to-1 multiplexers 421–427. The data input signals D0–D7 are output from the plurality of logical gates 44. The selecting signal SD 43 includes signals S0, S1, S2. Furthermore, the circuit diagram of the 2-to-1 multiplexer 421 is schematically illustrated in FIG. 5b. The 2-to-1 multiplexer 421 has three inputs including two data signal (i.e. D0 and D1) and a selective signal S0 and one output OUT. The other 2-to-1 multiplexers 422–427 have an architecture comparable to that of multiplexer 421.

Referring to FIG. 4 again, an exemplified description is given hereinafter. The value of N is supposed to be 3, and the bit-length of the adder 10 is assumed to be 8-bit. At the first clock, a 3-bit data 101 is input into the adder 10. Since the output of the queuing circuit 20 is null at this time, the 3-bit data 101 is then stored in the first column of the queuing circuit 20. At the second clock, a 6-bit data 001001 is input into the adder 10. Then the 6-bit data 001001 is input into the first column of the queuing circuit 20 while the 3-bit data is transferred into the second column of the queuing circuit 20. At the third clock, a 8-bit data 01101001 is input into the adder 10. Then the 8-bit data 01101001 is input into the first column of the queuing circuit 20 while the 6-bit data is transferred into the second column of the queuing circuit 20 and the 3-bit data is transferred into the third column of the queuing circuit 20. At the fourth clock, another 3-bit data 011 is input into the adder 10, and the 3-bit data 101 is input into the adder 10 and the comparing circuit 30. Therefore, the adding result of the adder 10 is 1000 and is also output into the comparing circuit 30. As a result, the state of the overflow binary (i.e., the fourth bit) of the 3-bit data is changed from 0 to 1. And the fourth comparator of the comparing circuit 30 outputs a high level signal which causes the first OR gate to the fourth OR gate output high level signals. The selective signal SD then controls the multiplexer 42 to output a high level signal to represent the overflow status of the 3-bit data. Thereafter, the 6-bit data 001001 is transferred into the third column of the queuing circuit 20 while the 8-bit data 01101001 is transferred into the second column of the queuing circuit 20. At the fifth clock, another 6-bit data 010010 is input into the adder 10, as well as the 6-bit data 001001. Hence, the adding result of the adder 10 is 011011. The 6-bit data 011011 is input into the comparing circuit 30 and the first column of the queuing circuit 20 while the 8-bit data 01101001 is transferred into the third column of the queuing circuit 20. The seventh comparator of the comparing circuit 30 will not output a high level signal since the states of its two input ports is the same. At the sixth clock, another 8-bit data 11001100 is input into the adder 10 to add with the feedback of the queuing circuit 20, i.e., 01101001. The adding result 100110101 is input into the first column of the queuing circuit 20. Of course, the MSB of the data 100110101 can not be stored in the queuing circuit 20. The MSB will be lost or be stored in a register (i.e., carry-bit register which is not shown in the drawings) to indicate the overflow status. At the same time, the 6-bit data 011011 is transferred into the second column. As mentioned above, the overflow signal of a multiple-bit data can be used by the control means of a system such as the central processing unit to indicate that the adding result is correct or not and to correct the adding result or for other purposes.

While the present invention has been particularly shown and described with reference to preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An apparatus for indicating an overflow status of bit-variable data employing a pipelining adder, comprising:

adding means having a first input port and a second input port, for adding a multiple-bit data input from said first input port and a multiple-bit data input from said second input port;

queuing means for receiving and storing a plurality of multiple-bit data output from said adding means, and sequentially outputting said plurality of multiple-bit data into said second input port of said adding means in response to a clock signal;

comparing means for receiving and comparing a multiple-bit data output from said adding means and a multiple-bit data output from said queuing means;

overflow arbitrating means for arbitrating the overflow status of each multiple-bit data in accordance with the comparing result from said comparing means.

2. An apparatus as claimed in claim 1 wherein said queuing means includes a plurality of shift registers, each of said shift registers receiving a bit output from said adder.

3. An apparatus as claimed in claim 2 wherein each of said plurality of shift registers includes a plurality of flip-flops connected serially.

4. An apparatus as claimed in claim 1 wherein said comparing means includes a plurality of comparators, each of said comparators having one output port and two input ports and outputting logical "1" only when levels applied to said two input ports are different.

5. An apparatus as claimed in claim 1 wherein said overflow arbitrating means includes a plurality of logical gates coupled to said comparing means and a multiplexer coupled to said plurality of logical gates, said multiplexer being responsive to a selecting signal for providing an overflow status indication output.

6. An apparatus as claimed in claim 5 wherein one input port of each logical gate is connected to an output port of a logical gate being previously adjacent thereto.

7. An apparatus for indicating the overflow status of bit-variable data employing a pipelining added, comprising:

an adder having a first input port and a second input port, for receiving and adding a multiple-bit data through said first input port and a multiple-bit data through said second input port in parallel;

a queuing device connected to the output port of said adder in parallel, for storing the adding result from said adder and outputting said multiple-bit data into said second input port;

a comparing circuit connected to both of an output port of said queuing device and an output port of said adder, for simultaneously receiving and comparing the adding result from said adder and the multi-bit data output from the queuing device;

an overflow arbitrating unit connected to an output port of said comparing circuit, for outputting the overflow status of said multiple-bit data in response to a selecting signal.

8. An apparatus as claimed in claim 7 wherein said queuing device includes a plurality of shift registers, each of said shift registers receiving a bit output from said adder.

9. An apparatus as claimed in claim 8 wherein each of said plurality of shift registers includes a plurality of flip-flops connected serially.

10. An apparatus as claimed in claim 7 wherein said comparing circuit includes a plurality of comparators, each of said comparators having an output port and two input ports and outputting a high level signal only when levels applied to said two input ports are different.

11. An apparatus as claimed in claim 7 wherein said overflow arbitrating unit includes a plurality of logical gates coupled to said comparing means and a multiplexer coupled to said plurality of logical gates, said multiplexer being responsive to a selecting signal for providing an overflow status indication output.

12. An apparatus as claimed in claim 11 wherein one input port of each logical gate is connected to an output port of a logical gate being previously adjacent thereto.

13. A method for indicating an overflow status of bit-variable data employing a pipelining adder, comprising the following steps:

inputting multiple-bit data in parallel into a queuing device through an adder, and storing said multiple-bit data in said queuing device;

outputting said multiple-bit data from said queuing device one by one to said adder, and adding each of said multiple-bit data respectively to corresponding multiple-bit data being consecutively input into said adder;

outputting an adding result from said adder simultaneously to said queuing device and to a comparing circuit;

comparing an output from said queuing device and an output from said adder by said comparing circuit and providing a comparison result;

deciding by an overflow arbitrating unit an overflow status of each multiple-bit data according to the comparison result.

14. A method as claimed in claim 13 wherein the step of providing a comparison result includes the step of providing an output status of said comparing circuit at a high level only when levels applied to two input ports of said comparing circuit are different.

15. A method as claimed in claim 13 wherein the step of providing an overflow status includes the step of outputting by said overflow arbitrating unit a binary to represent the overflow status of a multiple-bit data in response to a selecting signal corresponding to the multiple-bit data.

16. A method as claimed in claim 13 wherein the step of storing said multiple-bit data in said queuing device includes the step of storing each binary of a multiple-bit data in each of a corresponding one of a plurality of shift registers.

17. A method as claimed in claim 16 wherein the step of storing each binary of a multiple-bit data in each of a corresponding one of a plurality of shift registers includes the step of storing said each binary in a corresponding flip-flop of each corresponding one of said plurality of shift registers.

18. A method as claimed in claim 17 wherein the step of storing said each binary in a corresponding flip-flop includes the step of transferring in parallel each binary of the multiple-bit data stored in the corresponding flip-flop to a flip-flop adjacent to the corresponding flip-flop.

* * * * *